(12) United States Patent
Lalji et al.

(10) Patent No.: US 8,914,544 B2
(45) Date of Patent: Dec. 16, 2014

(54) COMPUTER-IMPLEMENTED SYSTEM AND METHOD FOR TRANSPARENTLY INTERFACING WITH LEGACY LINE OF BUSINESS APPLICATIONS

(75) Inventors: Alkarim "Al" Lalji, Bothell, WA (US); John Michael Gross, Redmond, WA (US); Shrinidhi Krishnamurthy, Redmond, WA (US)

(73) Assignee: Smartek21, LLC, Kirkland, WA (US)

( * ) Notice: Subject to any disclaimer, the term of this patent is extended or adjusted under 35 U.S.C. 154(b) by 589 days.

(21) Appl. No.: 13/166,612

(22) Filed: Jun. 22, 2011

(65) Prior Publication Data
US 2011/0320366 A1 Dec. 29, 2011

Related U.S. Application Data

(60) Provisional application No. 61/357,955, filed on Jun. 23, 2010.

(51) Int. Cl.
*G06F 15/16* (2006.01)
*G06Q 10/06* (2012.01)
*G06Q 10/10* (2012.01)

(52) U.S. Cl.
CPC .............. *G06Q 10/06* (2013.01); *G06Q 10/103* (2013.01)
USPC ....................................................... 709/246

(58) Field of Classification Search
CPC ........ H04L 29/06; G06Q 10/10; G06Q 10/06; G06F 13/12; G06F 17/30893
USPC .................... 709/246; 705/300–301
See application file for complete search history.

(56) References Cited

U.S. PATENT DOCUMENTS

| | | | |
|---|---|---|---|
| 6,151,602 A | 11/2000 | Hejlsberg et al. | |
| 6,157,927 A | 12/2000 | Schaefer et al. | |
| 6,178,418 B1 | 1/2001 | Singer | |
| 6,229,534 B1 | 5/2001 | Gerra et al. | |
| 6,253,244 B1 * | 6/2001 | Moore et al. | 709/231 |
| 6,381,579 B1 | 4/2002 | Gervais et al. | |
| 6,611,498 B1 | 8/2003 | Baker et al. | |
| 6,757,869 B1 | 6/2004 | Li et al. | |
| 6,810,429 B1 | 10/2004 | Walsh et al. | |
| 6,901,590 B2 | 5/2005 | Narayanaswamy et al. | |
| 6,990,513 B2 | 1/2006 | Belfiore et al. | |
| 6,990,636 B2 | 1/2006 | Beauchamp et al. | |
| 7,007,278 B2 | 2/2006 | Gungabeesoon | |
| 7,222,448 B2 | 5/2007 | Riley | |
| 7,243,120 B2 | 7/2007 | Massey | |

(Continued)

*Primary Examiner* — Michael Won
*Assistant Examiner* — Karina J Garcia-Ching
(74) *Attorney, Agent, or Firm* — Patrick J. S. Inouye; Makiko Coffland

(57) ABSTRACT

A computer-implemented system and method for transparently interfacing with legacy line of business applications is provided. A plurality of legacy line of business applications execute on a line of business server platform. A connector is interfaced to each legacy line of business application. Each legacy line of business application implements business logic for a specific business need. A dashboard application executes on a client platform into which at least one Widget application is tailored to and installed for one or more of the legacy line of business applications. An enterprise collaboration server executes on a collaboration server platform communicatively interposed between the line of business server platform and the client platform. A data access framework coupled to the dashboard application is provided through a user interface layer. A data service bus coupled to the line of business applications through their respective connector and to the data access framework is provided.

18 Claims, 4 Drawing Sheets

(56) References Cited

U.S. PATENT DOCUMENTS

| | | |
|---|---|---|
| 7,289,964 B1 * | 10/2007 | Bowman-Amuah ........... 705/1.1 |
| 7,315,853 B2 | 1/2008 | Brunswig et al. |
| 7,370,064 B2 | 5/2008 | Yousefi'zadeh |
| 7,404,185 B2 | 7/2008 | Zhang et al. |
| 7,412,497 B2 | 8/2008 | Viswanath et al. |
| 7,580,946 B2 | 8/2009 | Mansour et al. |
| 7,581,190 B2 | 8/2009 | Pintos et al. |
| 7,640,239 B2 | 12/2009 | Britton et al. |
| 7,676,486 B1 | 3/2010 | Tulkoff et al. |
| 7,725,605 B2 * | 5/2010 | Palmeri et al. ................ 709/246 |
| 7,735,097 B2 | 6/2010 | Kovachka-Dimitrova et al. |
| 7,904,803 B2 | 3/2011 | Coulthard et al. |
| 8,073,777 B2 | 12/2011 | Barry et al. |
| 2002/0026507 A1 | 2/2002 | Sears et al. |
| 2003/0163570 A1 | 8/2003 | Hendley et al. |
| 2004/0177335 A1 | 9/2004 | Beisiegel et al. |
| 2006/0126801 A1 | 6/2006 | Laperi et al. |
| 2008/0162209 A1 * | 7/2008 | Gu et al. ........................ 705/7 |
| 2010/0192140 A1 | 7/2010 | Kamiyama et al. |

* cited by examiner

Figure 4. 60

| Home | About Us | Departments | My Benefits | My Career | Tools | HR Portal |

*Employee Dashboard*

| Personal Administration | Compensation | Time Management |

My Information
Richard Hill / Research Analyst
richardhill@abc.com Ext. 4507

Quick Time Entry

June 10
M T W T F S S
 1 2 3 4 5 6
7 8 9 10 11 12 13
14 15 16 17 18 19 20
21 22 23 24 25 26 27
28 29 30

Attendance

Receiving Cost Center:

Activity Type

Hours

Hours

Hours

Submit    Cancel

Schedule / Time Off

| | MM/12 | MM/13 | MM/14 | MM/15 | MM/16 | MM/17 | MM/18 |
|---|---|---|---|---|---|---|---|
| | 0 | 0 | 0 | 0 | 0 | 0 | 0 |

■ Holiday  ■ Day Off Planned Hours Off)

| | | | |
|---|---|---|---|
| Vacation | 10 days | 3 days | 7 days |
| Sick Time | 5 days | None | 5 days |
| Maternity | N/A | N/A | N/A |
| Leave of Absence | N/A | N/A | N/A |

Request Time Off    Cancel

Paystubs
| Start Date | End Date | Period |
|---|---|---|
| MM/DD/YYYY | MM/DD/YYYY | MM/DD/YYYY |
| MM/DD/YYYY | MM/DD/YYYY | MM/DD/YYYY |

Benefits
| Start Date | End Date | Period |
|---|---|---|
| Medical | $0 | $193 | $20/30/50 |
| Prescriptions | $20/30/50 | $30 | $20/30/50 |
| Dental/Vision | $0 | $5 | |

Company Resource
IT support Center
Employee Handbook
Employee Satisfaction Survey
Policy Statement

Travel And Expenses
| | Invoice | Claimed | Paid |
|---|---|---|---|
| Airline | $500 | $450 | $450 |
| Personal Car | $50 | $35 | $00 |
| Hotel | $550 | $500 | $500 |

My Task | My Reminder

Next Page >

| Subject | Assigned To | Created Date | Priority | Due Date | Status | |
|---|---|---|---|---|---|---|
| Review goals with Joseph | Roy McCowan | Today | High | Today | Not Started | x |
| Schedule review with Elsa | Muru Ganesan | Today | Low | MM/DD/YY | Not Started | x |
| Review goals with Andy | Rob Plang | Yesterday | Medium | Today | Not Started | x |
| Prepare team strategy review | Jay Leno | Yesterday | High | MM/DD/YY | In Progress | x |
| Schedule team lunch & learn | Shrini Krishna | Yesterday | High | MM/DD/YY | In Progress | x |

New Task

COMPUTER-IMPLEMENTED SYSTEM AND METHOD FOR TRANSPARENTLY INTERFACING WITH LEGACY LINE OF BUSINESS APPLICATIONS

CROSS-REFERENCE TO RELATED APPLICATION

This non-provisional patent application claims priority under 35 U.S.C. §119(e) to U.S. Provisional Patent Application Ser. No. 61/357,955, filed Jun. 23, 2010, the disclosure of which is incorporated by reference.

FIELD

This invention relates in general to line of business software workflow and, in particular, to a computer-implemented system and method for transparently interfacing with legacy line of business applications.

BACKGROUND

Generally speaking, line of business ("LOB") applications refer to a class of vertical and often highly customized software applications used primarily in enterprise computing environments to implement business essential and mission-critical corporate functionality. LOB applications provide core functionality in support of the day-to-day operations of a corporation or other form of large organization, such as a hospital, government, university, non-profit organization, and the like. Herein, corporations and corporate need will be mentioned in the context of LOB applications, but these terms should be understood to apply to all forms of organization, corporate or otherwise, whether large or small, that rely on LOB applications to fulfill an internal computer automation business need.

Programmatically, LOB applications implement the rules and policies, organizational workflow and operations, and business heuristics that together define the crucial backbone operations that are used internally by various departments within an organization, such as human resources, corporate relations, sales, marketing, and production, although LOB applications could also provide other kinds of less critical or non-core functionality.

When adapting and customizing enterprise platform solutions for a corporate customer, business needs are generally translated into separate LOB applications that vertically align with each specific business need, but not necessarily with providing functionality for the business needs of other departments within the corporation. As a result, access to each type of LOB application has historically been limited to those employees working within the functional area of the department from which the business need originated. For instance, a human resources (HR) department would typically be charged with control over those LOB applications concerning payroll, benefits, vacation, recruiting, and the like. Personnel in other departments outside of HR would not ordinarily have access to the HR department's LOB applications.

While restricting access ensures only authorized use of a vertical LOB application by the originating department's employees, other personnel outside of a responsible department's immediate staff may also have legitimate business reasons for wanting to access another department's LOB application, albeit in a possibly more limited or restricted fashion. Conventional approaches to providing limited access to employees and other personnel who are outside of a responsible department has ordinarily required implementing a separate programmatic interface into the LOB application. For instance, separate interfaces might be needed to provide restricted access to an HR department's LOB application for employees in the corporate relations, sales, and marketing departments. The utility of providing a separate interface to each outside department can be outweighed by cost and complexity, yet denying personnel in outside departments access to other departments' LOB applications forces those employees to resort to less efficient means of interoperating and conducting corporate affairs, including undertaking manual workflow.

Therefore, a need remains for providing flexible interfaces to LOB applications to meet the divergent interests of personnel in different departments, as well as other authorized individuals, within a corporate enterprise.

SUMMARY

A set of legacy line of business (LOB) applications implement business logic for a specific business need. A set of wrappers provide workflow timing and data integration of business rules and interface the LOB applications to integration business adapters. In turn, the integration business adapters communicate with middle tier components executing on an enterprise collaboration platform via an enterprise service bus that is coupled to a data access framework. End users execute a dashboard application on client systems that are functionally connected to a Widget-based user interface layer also executing on the enterprise collaboration platform. Widgets installed within each dashboard application provides end-to-end access to the LOB applications in collaboration with the user interface layer and data access framework.

One embodiment provides a computer-implemented system and method for transparently interfacing with legacy line of business applications. A plurality of legacy line of business applications execute on a line of business server platform. A connector is interfaced to each legacy line of business application. Each legacy line of business application implements business logic for a specific business need. A dashboard application executes on a client platform into which at least one Widget application is tailored to and installed for one or more of the legacy line of business applications. An enterprise collaboration server executes on a collaboration server platform communicatively interposed between the line of business server platform and the client platform. A data access framework coupled to the dashboard application is provided through a user interface layer. A data service bus coupled to the legacy line of business applications through their respective connector and to the data access framework is provided.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit the scope of the present invention. Accordingly, the drawings and detailed description are to be regarded as illustrative in nature and not as restrictive.

BRIEF DESCRIPTION OF THE DRAWINGS

FIG. 4 is a diagram showing, by way of example, a screen shot of a user interface presented by one of the client systems of FIG. 1.

DETAILED DESCRIPTION

At a high level, an LOB application implements business logic in software. In turn, the business logic includes rules that express business policy. The rules also express business workflow that enumerates ordered tasks and define information flow from one person or entity to another. Other LOB functionality is also possible. Conventionally, LOB applications have frequently been developed to meet the needs of a specific customer by adapting and customizing a solution from an enterprise platform software suite, including so-called cloud computing platforms, to a specific business deployment.

Figure 1:
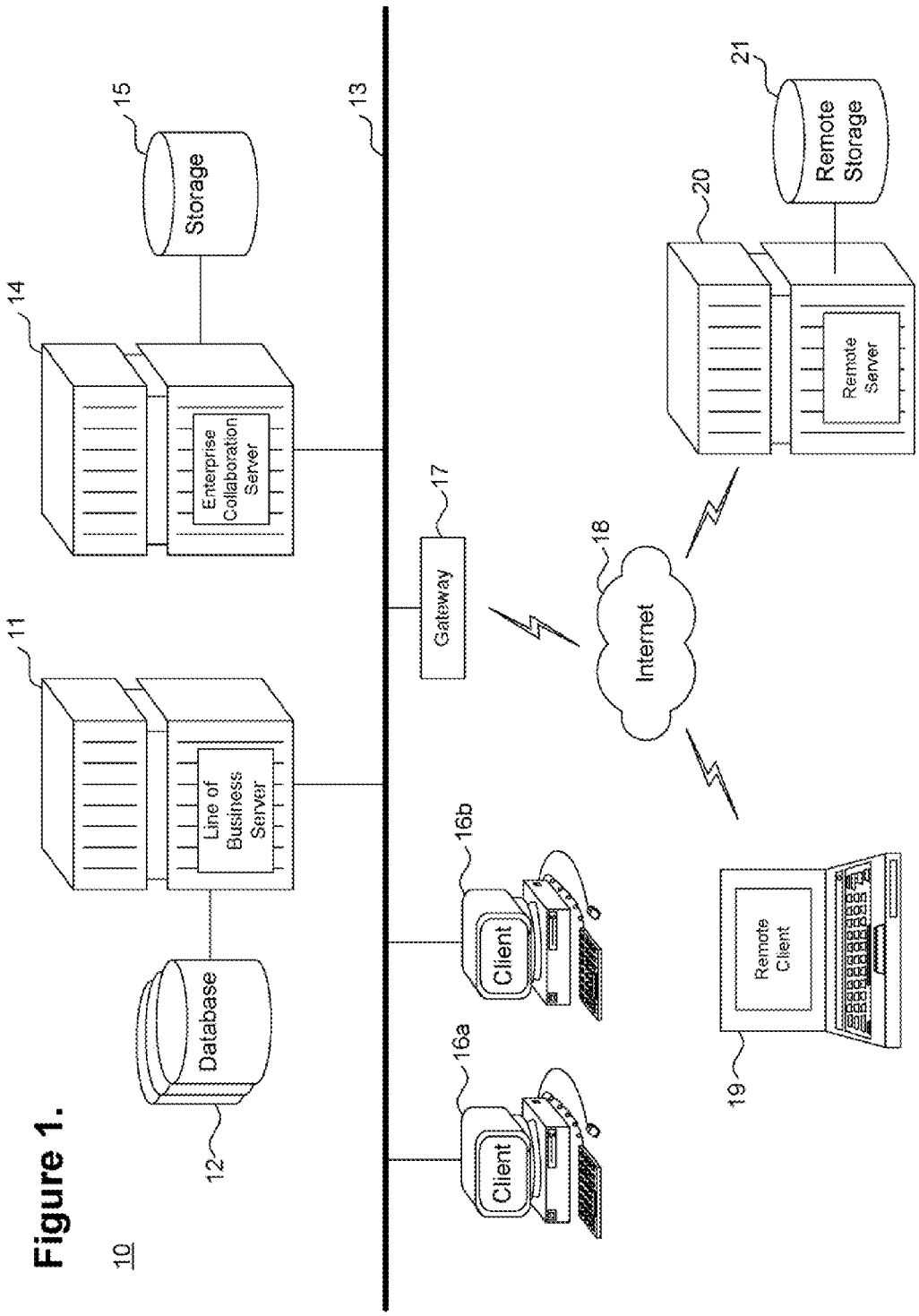
FIG. 1 is a block diagram showing an exemplary enterprise environment for transparently interfacing to a legacy line of business applications.

In general, LOB applications are implemented through enterprise software platform suites typically configured to operate in a client-server topology within an enterprise computing environment. FIG. 1 is a block diagram 10 showing an exemplary enterprise environment 10 for transparently interfacing to a legacy line of business application. A typical enterprise environment includes both local enterprise components operating within the confines of a corporate local area network or intranetwork 13, and remote outside components operating over a wide area network or internetwork 18, such as the Internet. The internetwork 13 and internetwork 18 are preferably securely implemented and interconnected in varying combinations of wired and wireless media with access provided through a gateway 17 or similar device.

Enterprise computing environments are generally setup to operate in a client-server configuration, although peer-to-peer configurations are also possible. For a client-server configuration within an intranetwork 13 section of an enterprise, LOB applications are deployed on one or more servers 11, 14 of various types. Clients 16a, 16b, which are assigned to users in different departments or functional areas of responsibility within a company, interconnect to the servers 11, 14 over the internetwork 13 to access the LOB applications. Similarly, for a client-server configuration in an internetwork 18 section of an enterprise, remote clients 19 and remote servers 20, which can be coupled to remote storage 21, collaboratively interface with the enterprise components located inside the local enterprise environment.

Server functionality may be provided through a single physical server system, or by a combination of distributed server systems operating collaboratively. The distributed servers can be situated both within and outside of the intranetwork 13. Other types of enterprise components, both within and outside of a local enterprise environment, could also be a part of the full enterprise environment, including cloud computing platforms. The servers 11, 14, 20 and clients 16a, 16b, 19 include hardware components conventionally found in general purpose programmable computing devices, such as a central processing unit, memory, input/output ports, network interfaces, and non-volatile storage, and execute software programs structured into routines, functions, and modules for execution on the various systems.

The local enterprise components include an LOB server 11 that are either a single server or collaboratively-configured servers coupled to one or more databases 12, within which enterprise information is maintained. The LOB server 11 stores and executes one or more LOB server applications (not shown), which implement server business logic for a specific business need. The LOB server 11 executes an enterprise software platform suite, such as SAP Netweaver, Oracle E-Business Suite, and so forth, and each LOB application is implemented through the enterprise software platform suite. Other current LOB products and vendors include, by way of example, the SAP CRM (Customer Relationship Management) Solution suite, licensed by SAP America, Newtown Square, Pa.; the Force.com cloud computing platform, licensed by Salesforce.com, San Francisco, Calif.; the Microsoft Dynamics GP suite, formerly Great Plains accounting software, licensed by Microsoft Corporation, Redmond, Wash.; the PeopleSoft HRMS (Human Resources Management Systems), FMS (Financials Management Systems), CRM software suites, formerly licensed by PeopleSoft, Inc., Pleasanton, Calif., since acquired by Oracle Corporation; and the Oracle E-Business Suite, licensed by Oracle Corporation, Redwood Shores, Calif.

Client systems 16a, 16b can access the LOB applications on the LOB server 11 locally via the intranetwork 13 or remotely via the internetwork 18. The LOB server 11 provides authentication and access to the LOB applications and databases 12 assigned to the enterprise function. Each client system 16a, 16b must have permissions or authorizations to access the LOB applications and databases. Access to each vertically-aligned LOB application is generally limited to those clients 16a, 16b being operated by end users in the specific department or functional area of a corporation to which the LOB application belongs. For instance, end users on client systems 16a, 16b assigned to the human resources department are allowed to execute those LOB applications and databases on the LOB server 11 provided in support of human resources functions. Typically, other non-human resources end users are precluded from using those LOB applications or data.

The restrictions on access to the LOB applications and their corresponding databases as vertically-aligned by the business needs and workflow of individual corporate departments can be relaxed, as least partially, by providing additional LOB applications or portals custom tailored to the needs of a wider set of users. However, creating and supporting customized special need LOB applications can entail significant time and cost, which increases with the number and complexity of applications. Each of the separate interfaces entails the expenditure of additional resources, time, and cost. Moreover, the complexity of interfacing to internal LOB applications, and therefore costs, rapidly climb as the number of separate interfaces into each vertical set of LOB applications grows. In the worst case, a different interface could be required for each outside department needing access to a single vertical LOB application. Rather than undergoing the development and deployment of specialized LOB application interfaces for each different outside department with a need for access, such needs for horizontal access to LOB applications could be met by introducing an integration collaboration architecture, including an enterprise collaboration server 14, as further described below, to intermediate between the client systems of end users and the LOB applications and databases operating on the LOB servers.

Figure 2:
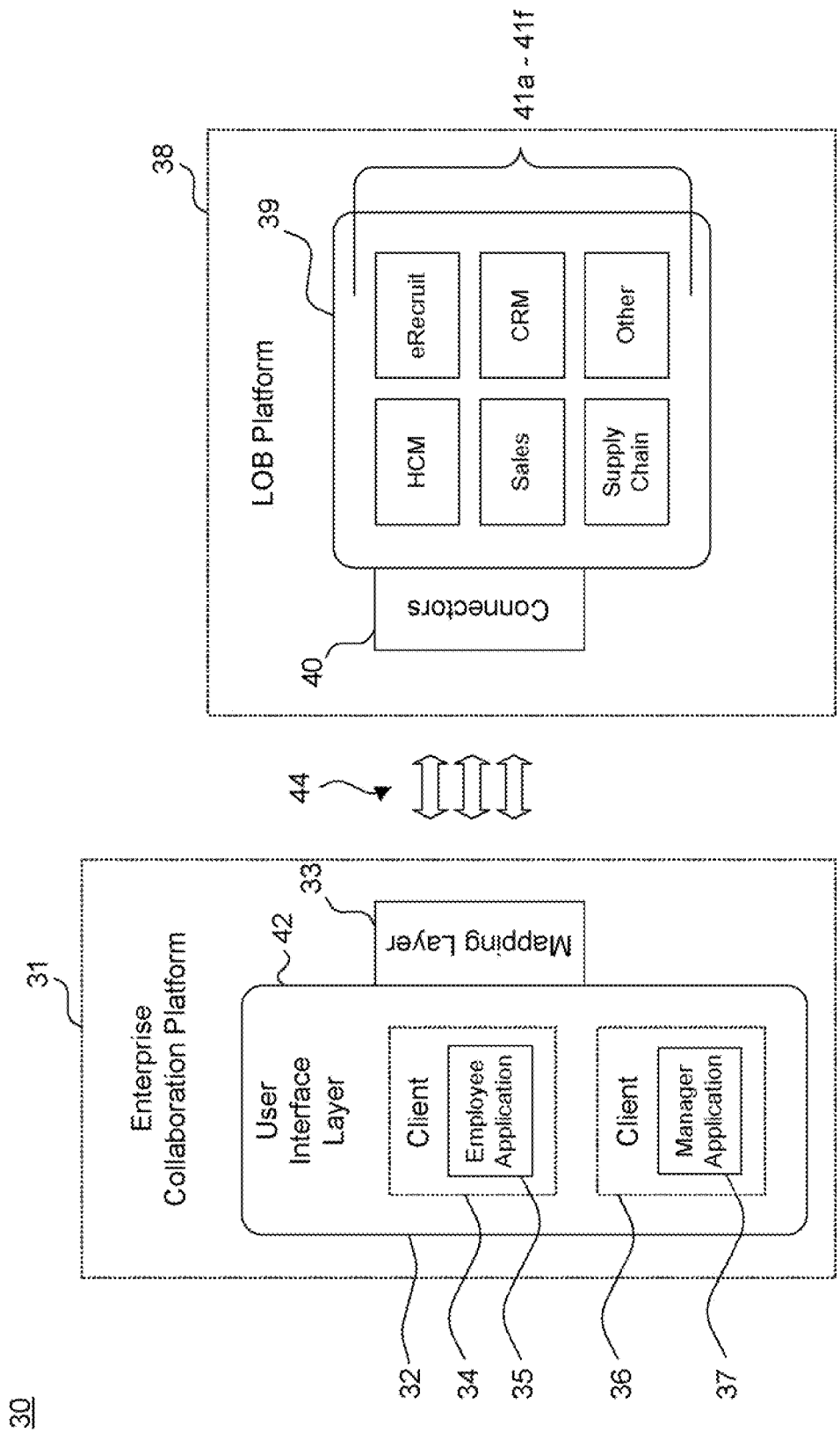
FIG. 2 is a functional block diagram showing a process flow for the components of FIG. 1.

One embodiment provides an enterprise collaboration server 14 that is coupled to storage 15 and interfaced to both the LOB server 11 and various clients, including local clients 16a, 16b and remote clients 19 (hereafter collectively referenced as simply "clients"). The integration collaboration architecture implements each of the various functions performed by the LOB server 11, enterprise collaboration server 14 and clients 16a, 16b, 19. FIG. 2 is a functional block diagram showing a process flow 30 for the components of FIG. 1. The process flow 30 is performed collaboratively by an LOB server 36, enterprise collaboration server 31, and clients 34, 36.

The enterprise collaboration server 14 interfaces the clients 16a, 16b, 19 with LOB applications executing on an LOB server 11. In addition, each client 16a, 16b, 19 executes a dashboard application into which LOB application-tailored widgets can be installed. Finally, a set of wrappers 39 is introduced into the LOB server 11 to allow communication with the enterprise collaboration server 14 over an enterprise service bus.

The LOB server 11 executes a set of LOB applications 41a-f that implement business logic for enterprise functions 41a-f, such as human capital management ("HCM"), electronic recruiting ("eRecruit"), sales, customer relation management ("CRM"), and supply chain management. Other LOB applications are also possible. The LOB server 11 also executes a set of connectors 40 that include integration business adapters and a set of wrappers for each of the LOB applications 41a-f. An integration business adapter is software tailored to communicate with different LOB applications 41a-f, thereby allowing data exchange between two or more otherwise vertically-aligned LOB applications. A wrapper is an application that extracts content from a LOB application 41a-f information source and translates the content into another form, generally expressed a relational structured data for use by a dashboard application 35, 37, as further described below.

The enterprise collaboration server 31 functionally defines a mapping layer 33 and a Widget-based user interface layer 32, which respectively interface with the LOB server 36 and the clients 34, 36. The connectors 40 interface with the LOB server 36 via a mapping layer 33 that provides a data service bus coupled to a data access framework. In turn, the mapping layer 33 interfaces with end-user dashboard applications 35, 37, such as employee or manager dashboard applications, executing on the clients 34, 36 via a user interface layer 32. The details of the connectors 40, mapping layer 33, and user interface layer 32 are further described below with reference to FIG. 3.

Each end-user dashboard application 35, 37 provides an extensible user interface framework into which one or more widgets can be installed. The dashboard applications allow transparent access to the LOB applications 41a-f and decouple implementation of the user interface from LOB-application specifics. The details of the dashboard applications 35, 37 are further described below with reference to FIG. 4.

Figure 3:
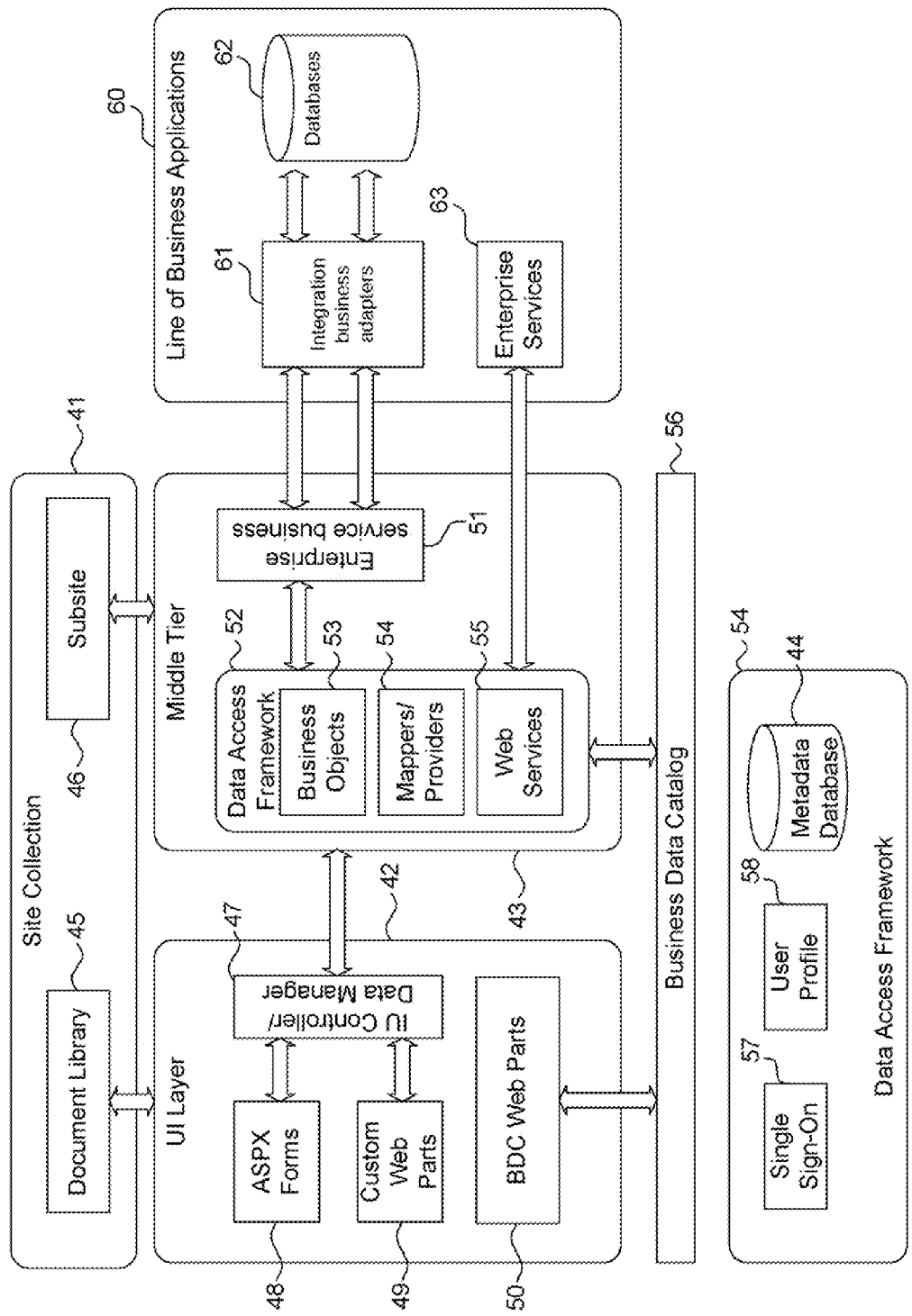
FIG. 3 is a block diagram showing an architectural view of the components of FIG. 1.

The integration collaboration architecture supplants the need to use vertical applications by insulating users from the specifics of each LOB application, thereby providing transparency and usability. FIG. 3 is a block diagram showing an architectural view 40 of the components of FIG. 1. Transparency in the interfacing of dashboard applications with and in the decoupling of services from the LOB applications is primarily provided through the enterprise collaboration server 31. The LOB server 38 and clients 34, 36 provide supporting functionality to respectively open up the LOB applications 41a-f to access by the enterprise collaboration server 31 and to present an extensible user interface on end-user client systems 34, 36.

Architecturally, the enterprise collaboration platform is structured into a set of server-side functions. The enterprise collaboration server 31 is structured into a site collection component 41, user interface layer 42, middle tier component 43, and data access framework 52. These components operate on a server platform for collaboration and Web publishing, such as Microsoft SharePoint server 2007, licensed by Microsoft Corporation, Redmond, Wash.

The site collection component 41 is used to organize local enterprise information. The site collection component 41 interfaces with the user interface layer 42 and middle tier component 43 to respectively provide access to a document library 45 and Web subsite 46. Users are able to access the document library 45 and the Web subsite 46 through their dashboard applications, which rely on the user interface layer 42 to present a user interface to end users. On the client side, the user interface layer 42 interacts with end-user dashboard applications. Widgets are installed in the dashboard applications to provide various forms of functionality. A user interface controller 47 provides a Web application framework using, for instance, C# and ASP.NET, licensed by Microsoft Corporation, Redmond, Wash. Accordingly, the user interface controller 47 executes stored ASPX forms 48 and custom Web parts 49 that allow end users to modify the content, appearance, and behavior of components, particularly widgets, within the Web pages that make up a dashboard application. On the middle tier component side, data is exchanged from the data access framework 52 through a data manager 47 that operates alongside the user interface controller 47. Data used by the dashboard applications is supplemented with business data that is retrieved from a business data catalog 56 using business data catalog Web parts. The data access framework 52 includes business objects 53 that incorporate the business logic required to operate on data directly within a dashboard application. The data access framework 52 also includes a set of mappers and providers 54 that convert and supply data to the widgets, as well as a set of Web services 55 provided through the dashboard applications.

The middle tier component 43 interfaces directly to the line of business server 60 through an enterprise service bus 51. In one embodiment, as an example, the enterprise service bus is implemented as a set of adapters 51, such as BizTalk WCF Adapters for SAP, licensed by Microsoft Corporation, Redmond, Wash. Sets of adapters for other LOB applications, including the Force.com cloud computing platform, Microsoft Dynamics GP Suite, PeopleSoft HRMS, FMS, and CRM software suites, and the Oracle E-Business Suite, could also be implemented and deployed. The adapters 51 constituting the enterprise service bus communicate with a corresponding set of integration business adapters 61, which can include business application programming interfaces (BAPI), remote function calls (RFC), and remote-enabled function modules (RFM). Other forms of adapters are possible. The adapters 51 are coupled to a set of wrappers that implement business logic interfaced to the LOB applications 62.

Finally, the data access framework 44 provides single sign-on functionality 57 and maintains user state through storage of user profile data 58. Site-wide state is maintained in a metadata database 59. The data access framework 44 synchronizes each user's LOB server credentials with their enterprise system credentials using an active directory, thereby eliminating the need for a user to enter their LOB credentials separately.

End users interface with the LOB applications on the LOB server through dashboard applications. FIG. 4 is a diagram showing, by way of example, a screen shot of a user interface presented by one of the client systems of FIG. 1. The dashboard application executes on a client system. Widgets are installed into the dashboard application to provide functionality. Widgets significantly reduce the need for employee self-service training and minimizes expenses associated with self-service deployment.

The exemplary employee dashboard shows an employee time management widget set. Other dashboards are possible. Multiple LOB applications are integrated into the dashboard as widgets for efficient review and management. An administrator can rearrange the order of widgets, remove widgets, or add widgets from other dashboard applications. Each widget is implemented through a combination of ASPX forms code 48, Web parts 49, written, for instance, in C#, business objects 53, and mappers and providers 54. A set of additional exemplary widgets, including their associated benefits are presented in TABLE 1. Other widgets could also be provided to cover other areas of LOB applications, including additional functions in human resources, corporate relations, sales, marketing, and production.

TABLE 1

| Widget | Widget Set | Benefits |
| --- | --- | --- |
| My Information | Used across sets | Presents the photo, email address, business contact information, and other similar types of information for an employee. |
| Company Resources | Used across sets | Provides a location to place links related to and information about the company. |
| My Tasks/ Reminder/Outbox | Dashboard (both) | Tracks all active tasks for an employee, provides him or her with reminders of those active tasks needing action, and supports an outbox identifying those active tasks that have been acted upon. For example, managers would see time sheet approval requests or PTO requests in their My Tasks/Reminder/Outbox. An employee would be presented with reminders of time sheets to revise or complete and could view the status of time sheets submitted. |
| My Organization | Manager Dashboard | By default, presents managers with a pictorial or textual summary wall of their direct reports, as well as those managers to whom they report. They can also select walls from a drop down list of units or divisions within their company. |
| Quick Time Entry | Employee Dashboard | From their dashboard, an employee can enter hours or other time units worked for a week or other time interval, defaulted to activities performed in the previous week, then submit these entries on-line for approval. |
| Schedule/ Time Off | Employee Dashboard | A calendar presenting the work schedule and time off for each week can be viewed for the time periods selected by the employee. |
| Paystubs | Employee Dashboard | An employee can view and print an image of their latest paystub or similar documents or use a calendar to select earlier paystubs. |
| Benefits | Employee Dashboard | The current status of benefits or similar documents available to an employee can be viewed and printed. |
| Travel and Expenses | Employee Dashboard | This widget provides a connection to travel plans, expenses reports, or similar documents being processed. |
| Personal Details | Personal Admin | An employee can enter and maintain entries in this widget that describe his personal or similar information. |
| Family Details/ Dependents | Personal Admin | The full names, nicknames, nationality and related information for family members or dependants can be maintained by an employee within this widget. |
| Work Details | Personal Admin | The contact information at work or similar information is maintained by an employee using this widget. |
| Addresses | Personal Admin | The addresses to use for personal or emergency contacts or similar information can be entered or modified in this widget by the employee. |
| Bank Accounts | Personal Admin | An employee can enter, revise, delete, and update their bank account information, not only for their primary bank, but also for secondary banks and other financial institution data. This information includes how much of their compensation they would like to send to each account as a value or percentage, whether by check or direct deposit. |
| Compensation History | Compensation | An employee can view their compensation history, selecting a range of pay periods using calendar lookups. |
| Base Pay | Compensation | Base pay can be viewed by an employee with a click of their mouse. |
| Tax Withholding | Compensation | Tax withholding information can be viewed and modified by an employee to reflect changes in their taxation status. |
| My Schedule | Time Management | The planned work schedule for different weeks can be viewed by an employee for upcoming months. |
| My PTO Balances | Time Management | Paid time off balances of various types can be reviewed as well as requests for time off submitted within this widget. |
| Time Entry | Time Management | Hours or other time units worked per day during each week can be charged to specific accounts, copies of hours from previous weeks can be accessed, hours can be revised before submission as they are saved, hours can be corrected if rejected after submission and viewed over different time periods. |
| Time Approval | Time Management | Requests for approvals of time sheets and their status are displayed in the manager's task list. |
| Sales | Sales and Distribution | Requests for approvals/status of Sales Orders and Distribution components within the manufacturing channel. |
| CRM | Customer Relation Management | Requests for approvals of Customer Relationship Management and their management components |
| Order Entry | Order Entry | Requests for sales orders and creation of sales orders. |
| Opportunities | Opportunity Management | Ability to organize sale opportunity in LOB applications. |

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for transparently interfacing with legacy line of business applications, comprising:
a line of business server configured to interface over a computer network and comprising a memory and a computer processor, the computer processor operatively coupled to the memory, to execute a plurality of legacy line of business applications, each of which is separately implemented for at least one of business functionalities, and to interface a set of integration business adapters to each of the legacy line of business applications, each legacy line of business application being configured to implement business logic for a specific business need, each integration business adapter comprising at least one of a business application programming interface, remote function call, and remote-enabled function module and being configured to communicate with each of the legacy line of business applications and to express relational structured data of the legacy line of business applications;
a client system configured to interface over the computer network and comprising a memory and a computer processor, the computer processor operatively coupled to the memory, and to execute a dashboard application into which a plurality of portal applications are installed for the legacy line of business applications and integrated as a collaboration platform for a plurality of business functionalities; and
an enterprise collaboration server communicatively interposed between the line of business server and the client system and configured to interface over the computer network and comprising a memory and a computer processor, the computer processor operatively coupled to the memory, the enterprise collaboration server comprising software being configured to provide data access framework coupled to the dashboard application through a user interface layer and an enterprise service bus coupled to the legacy line of business applications through their respective integration business adapter and to the data access framework, the enterprise service bus comprising a set of adapters and being configured to directly communicate with the set of integration business adapters that correspond to the set of adapters, the data access framework being configured to interface with a metadata database and maintain enterprise system credentials for all the legacy line of business applications and user profile data stored in the metadata database, to match each of the user profile data with the enterprise system credentials, and to provide the user access to at least one the legacy line of business applications provided at least one of the user profile data matches with one or more of the enterprise system credentials and further to provide business objects incorporating the business logic required to operate on the relational structured data directly within the dashboard application, the user interface layer being configured to dynamically modify the portal application in the dashboard application based on changes, additions, and deletions directly on the relational structured data.

2. A computer-implemented system according to claim 1, further comprising:
the line of business server further configured to extract content from a data source associated with the legacy line of business application and to translate the extracted content into another form of content for use by the dashboard application.

3. A computer-implemented system according to claim 1, further comprising:
the enterprise collaboration server further configured to implement the dashboard application and to provide a user interface to each portal application.

4. A computer-implemented system according to claim 3, further comprising:
the enterprise collaboration server coupled to the user interface layer and configured to organize local enterprise information,
wherein the local enterprise information is accessible via the dashboard application through the user interface layer.

5. A computer-implemented system according to claim 1, further comprising:
business data retrieved from a business data catalog executed by the enterprise collaboration server and configured to supplement the dashboard application.

6. A computer-implemented system according to claim 1, further comprising:
controls within the dashboard application executed by the client system to modify content, appearance, and behavior of the at least one portal application.

7. A computer-implemented system according to claim 1, further comprising at least one of:
the enterprise collaboration server further configured to convert and to supply data to the at least one widget application; and
the enterprise collaboration server further configured to convert and to supply data to Web services provided through the dashboard application.

8. A computer-implemented system according to claim 1, wherein sets of portal applications executed by the client system selected from the group comprises manager functions, employee functions, personal administration, compensation, time management, sales and distribution, customer relation management, order entry, and opportunity management.

9. A computer-implemented system according to claim 1, further comprising at least one of:
a set of rules executed by the enterprise collaboration server and configured to express business policy and to implement the business logic; and
a workflow executed by the enterprise collaboration server and configured to enumerate ordered tasks and to define information flow between entities and implementing the business logic.

10. A computer-implemented method for transparently interfacing with legacy line of business applications, comprising:
executing a plurality of legacy line of business applications on a line of business server interfacing over a computer network and comprising a memory and a computer processor, the computer processor operatively coupled to the memory, each of legacy line of business application being separately implemented for at least one of business functionalities, and interfacing a set of integration business adapters to each of the legacy line of business applications, each legacy line of business application implementing business logic for a specific business need, each integration business adapter comprising at least one of a business application programming interface, remote function call, and remote-enabled function module and communicating with each of the legacy line of business applications and expressing relational structured data of the legacy line of business applications;

executing a dashboard application on a client system interfacing over a computer network and comprising a memory and a computer processor, the computer processor operatively coupled to the memory, into which a plurality of portal applications are installed for the legacy line of business applications and integrated as a collaboration platform for a plurality of business functionalities; and executing an enterprise collaboration server communicatively interposed between the line of business server and the client system and interfacing over the computer network and comprising a memory and a computer processor, the computer processor operatively coupled to the memory, comprising:

providing a data access framework coupled to the dashboard application through a user interface layer, the data access framework interfacing with a metadata database and maintaining enterprise system credentials for all the legacy line of business applications and user profile data stored in the metadata database, matching each of the user profile data with the enterprise system credentials, and providing the user access to at least one the legacy line of business applications provided at least one of the user profile data matches with one or more of the enterprise system credentials and providing business objects incorporating the business logic required to operate on the relational structured data directly within the dashboard application, the user interface layer dynamically modifying the portal application in the dashboard application based on changes, additions, and deletions directly on the relational structured data; and providing an enterprise service bus coupled to the legacy line of business applications through their respective integration business adapter and to the data access framework, the enterprise service bus comprising a set of adapters and being configured to directly communicate with the set of integration business adapters that correspond to the set of adapters.

11. A computer-implemented method according to claim 10, further comprising:
providing a wrapper for extracting content from a data source associated with the legacy line of business application and translating the extracted content into another form of content for use by the dashboard application.

12. A computer-implemented method according to claim 10, further comprising:
implementing the dashboard application as a Web application framework providing a user interface to each portal application.

13. A computer-implemented method according to claim 12, further comprising:
organizing local enterprise information through a site collection component comprised in the enterprise collaboration server with a document library and a Web subsite and coupled to the user interface layer,
wherein the document library and a Web subsite are accessible via the dashboard application through the user interface layer.

14. A computer-implemented method according to claim 10, further comprising:
supplementing the dashboard application with business data retrieved from a business data catalog.

15. A computer-implemented method according to claim 10, further comprising:
including controls within the dashboard application to modify content, appearance, and behavior of the at least one portal application.

16. A computer-implemented method according to claim 10, further comprising at least one of:
including a set of mappers that convert and supply data to the at least one portal application; and
including a set of providers that convert and supply data to Web services provided through the dashboard application.

17. A computer-implemented method according to claim 10, further comprising:
providing sets of portal applications selected from the group comprising manager functions, employee functions, personal administration, compensation, time management, sales and distribution, customer relation management, order entry, and opportunity management.

18. A computer-implemented method according to claim 10, further comprising at least one of:
implementing the business logic through a set of rules that express business policy; and
implementing the business logic as a workflow, which enumerates ordered tasks and define information flow between entities.

* * * * *